US012562907B2

(12) United States Patent
Motylinski et al.

(10) Patent No.: US 12,562,907 B2
(45) Date of Patent: Feb. 24, 2026

(54) SYSTEMS AND METHODS FOR PARALLEL VERIFICATION OF BLOCKCHAIN TRANSACTIONS

(71) Applicant: nChain Licensing AG, Zug (CH)

(72) Inventors: Patrick Motylinski, London (GB);
Stephane Vincent, Luxembourg (LU);
Giuseppe Destefanis, London (GB);
Simone Madeo, London (GB); Craig Steven Wright, London (GB)

(73) Assignee: NCHAIN LICENSING AG, Zug (CH)

( * ) Notice: Subject to any disclaimer, the term of this patent is extended or adjusted under 35 U.S.C. 154(b) by 1 day.

(21) Appl. No.: 18/407,336

(22) Filed: Jan. 8, 2024

(65) Prior Publication Data

US 2024/0195621 A1    Jun. 13, 2024

Related U.S. Application Data

(63) Continuation of application No. 16/611,829, filed as application No. PCT/IB2018/053110 on May 4, 2018, now Pat. No. 11,902,441.

(30) Foreign Application Priority Data

May 8, 2017    (GB) ...................................... 1707296

(51) Int. Cl.
*H04L 9/32* (2006.01)
*G06Q 20/06* (2012.01)
(Continued)

(52) U.S. Cl.
CPC ........... *H04L 9/32* (2013.01); *G06Q 20/0658* (2013.01); *G06Q 20/3678* (2013.01);
(Continued)

(58) Field of Classification Search
CPC . H04L 9/32; H04L 9/0637; H04L 9/50; H04L 2209/56; G06Q 20/0658; G06Q 20/3678; G06Q 2220/00; G06Q 20/065
See application file for complete search history.

(56) References Cited

U.S. PATENT DOCUMENTS 6,438,741 B1 *    8/2002    Al-omari .......... G06F 16/24542
                                                707/694
7,672,981 B1      3/2010    Faibish et al.
(Continued)

FOREIGN PATENT DOCUMENTS

CN          102299959 A   *  12/2011
CN          101719258 B   *   8/2012    ............. H04L 45/00
(Continued)

OTHER PUBLICATIONS

Andreas M. Antonopoulos, Mastering Bitcoin, Dec. 2014, O'Reilly Media, Inc. (Year: 2014).*
(Continued)

*Primary Examiner* — Chunling Ding
(74) *Attorney, Agent, or Firm* — Tarolli, Sundheim, Covell & Tummino LLP

(57) ABSTRACT

A computer-implemented method to validate a block at a node within a network of nodes implementing a blockchain conforming to a blockchain protocol. This may be the Bitcoin protocol or an alternative. The method includes determining, serially, that each unspent transaction output referenced as an input in each of the plurality of transactions is unique and, based on that determination allocating each transaction in the plurality of transactions to one of two or more parallel processors, and verifying, in parallel, by the two or more parallel processors, that the transactions in the plurality of transactions comply with transaction-level validation criteria. The node also determines that the block meets block-level validation criteria. If the transactions
(Continued)

comply with transaction-level validation criteria and the block complies with block-level validation criteria, the block is deemed valid and the node forwards the block to one or more peer nodes in the network.

15 Claims, 4 Drawing Sheets

(51) Int. Cl.

| | |
|---|---|
| *G06Q 20/36* | (2012.01) |
| *H04L 9/06* | (2006.01) |
| *H04L 9/00* | (2022.01) |

(52) U.S. Cl.

CPC ....... *H04L 9/0637* (2013.01); *G06Q 2220/00* (2013.01); *H04L 9/50* (2022.05); *H04L 2209/56* (2013.01)

(56) References Cited

U.S. PATENT DOCUMENTS

| | | | |
|---|---|---|---|
| 9,811,391 | B1 | 11/2017 | Barrett et al. |
| 10,050,779 | B2 | 8/2018 | Alness et al. |
| 10,642,643 | B2 | 5/2020 | Qiu |
| 11,010,369 | B2 | 5/2021 | Zhuang |
| 11,036,765 | B1 * | 6/2021 | Nagarathnam ........ G06Q 10/10 |
| 2013/0031550 | A1 | 1/2013 | Choudhury et al. |
| 2016/0292680 | A1 | 10/2016 | Wilson, Jr. et al. |
| 2017/0091726 | A1 | 3/2017 | Morgan et al. |
| 2017/0212781 | A1 * | 7/2017 | Dillenberger ......... G06F 9/5038 |
| 2017/0300318 | A1 | 10/2017 | Goniwada et al. |
| 2017/0352012 | A1 * | 12/2017 | Heam .................... G06Q 40/12 |
| 2018/0089641 | A1 * | 3/2018 | Chan ...................... G06Q 40/06 |
| 2018/0158034 | A1 * | 6/2018 | Hunt ...................... G06Q 20/00 |
| 2018/0173719 | A1 * | 6/2018 | Bastide ................. G06F 40/166 |
| 2018/0293488 | A1 * | 10/2018 | Dang ..................... G06N 3/088 |
| 2019/0361731 | A1 * | 11/2019 | Qiu .......................... G06F 9/466 |
| 2020/0160336 | A1 | 5/2020 | Li |

FOREIGN PATENT DOCUMENTS

| | | | | |
|---|---|---|---|---|
| CN | 102681902 | A | 9/2012 | |
| CN | 103942102 | A * | 7/2014 | ............ G06F 9/466 |
| CN | 106062716 | A * | 10/2016 | ............ G06F 9/466 |
| CN | 106406896 | A | 2/2017 | |
| CN | 106528280 | A * | 3/2017 | ........... G06F 9/4843 |
| GB | 2540975 | A | 2/2017 | |
| JP | 2016218633 | A | 12/2016 | |

OTHER PUBLICATIONS

Andreas Antonopoulos, Mastering Bitcoin, Dec. 2014, O'Reilly Media, Inc. (Year: 2014).*

Andytoshi, "Looking into Forking the Core Wallet to use Parallel Computing to Verify Blocks," Bitcoin Forum, retrieved from https://bitcointalk.org/index.php?topic=816199.0;all, Jun. 21, 2017, 9 pages.

Anonymous, "Bitcoin Developer Guide," Bitcoin Project, https://web.archive.org/web/20160515171209/https://bitcoin.org/en/developer-guide, May 15, 2016 [retrieved Mar. 13, 2019], 55 pages.

Anonymous, "Looking into Forking the Core Wallet to Use Parallel Computing to Verify Blocks," retrieved from https://web.archive.org/web/20160130130538/https://bitcointalk.org/index.php?topic=816199.0;all, Jan. 30, 2016, 8 pages.

Antonopoulos, "Mastering Bitcoin—Unlocking Digital Cryptocurrencies," O'Reilly Media, Inc., Dec. 20, 2014, 282 pages.

Bitcoin Forum, Topic: Looking Into Forking the Core Wallet to Use Parallel Computing to Verify Blocks,: retrieved from https:bitcointalk.org/index.php?topic=816199.0, Oct. 8, 2014, 5 pages.

Dashjr, "Bitcoin 9000: A Dilettante's Guide to Bitcoin Scalability," retrieved from https://github.com/oleganza/bitcoinpapers/blob/943eae200e1587db82e5df09c8554a8c944dc043/Bitcoin9000.pdf, May 2, 2016, 13 pages.

European Office Action for Application No. 18726231.6, dated Jul. 8, 2021, 8 pages.

International Search Report and Written Opinion mailed Jul. 5, 2018, Patent Application No. PCT/IB2018/053110, 10 pages.

Jämthagen et al., "Blockchain-Based Publishing Layer for the Keyless Signing Infrastructure, " IEEE Conference on Ubiquitous Intelligence & Computing, Jul. 18, 2016, 8 pages.

Kontoghiorghes, "Handbook of Parallel Computing and Statistics," Chapman and Hall/CRC, Dec. 21, 2005, 32 pages.

Nakamoto, "Bitcoin: A Peer-to-Peer Electronic Cash System," Bitcoin, Oct. 31, 2008, https://bitcoin.org/bitcoin.pdf, 9 pages.

Okupski, "Bitcoin Developer Reference," retrieved from https://lopp.net/pdf/Bitcoin_Developer_Reference.pdf, Jul. 30, 2016, 43 pages.

Priestc, "BUIP033: (passed) Parallel Validation," Bitcoin Forum, retrieved from https://bitco.in/forum/threads/buip033-passed-parallel-validation. 1545/, Oct. 22, 2016, 14 pages.

Satoshi et al., "Connection Limits," Bitcoin Forum, Aug. 9, 2010, https://bitcointalk.org/index.php?topic=741.0;prev_next=prev, 2 pages.

Sipa, "Parallel Script Verification #2060," retrieved from https://github.com/bitcoin/bitcoin/pull/2060, Dec. 2, 2012, 4 pages.

Sukrim, "Bitcoind Block Verification using GPU?" retrieved from https://www.reddit.com/r/Bitcoin/comments/33yfby/bitcoind_block_verification_using_gpu/, Apr. 26, 2015, 7 pages.

TL121, "What Can be Done to Speed up Block Verification Time?" retrieved from https://www.reddit.com/r/btc/comments/5izppd/what_can_be_done_to_speed_up_block_verification/, Dec. 18, 2016, 8 pages.

UK Commercial Search Report mailed Jun. 23, 2016, Patent Application No. GB1707296.8, 6 pages.

UK IPO Search Report mailed Oct. 11, 2017, Patent Application No. GB1707296.8, 4 pages.

Wikipedia, "Uniform-Machines Scheduling," retrieved fro, https://en.wikipedia.org/w/index.php?title=Uniform-machines_scheduling&oldid=740923767, Sep. 24, 2016, 2 pages.

* cited by examiner

400

Processor ⎫ 402

Processor ⎫ 402

Processor ⎫ 402

⋮

Processor ⎫ 402

Memory ⎫ 404

Blockchain application ⎫ 408

Network Interface ⎫ 406

SYSTEMS AND METHODS FOR PARALLEL VERIFICATION OF BLOCKCHAIN TRANSACTIONS

CROSS REFERENCE TO RELATED APPLICATIONS

This application is a continuation of U.S. patent application Ser. No. 16/611,829, filed Nov. 7, 2019, entitled "SYSTEMS AND METHODS FOR PARALLEL VERIFICATION OF BLOCKCHAIN TRANSACTIONS," which is a 371 Nationalization of International Patent Application No. PCT/IB2018/053110, filed May 4, 2018, which claims priority to United Kingdom Patent Application No. 1707296.8, filed May 8, 2017, the disclosures of which are incorporated herein by reference in their entirety.

FIELD OF INVENTION

This invention relates generally to blockchain transactions and more particularly to methods and devices to enable fast validation and propagation of blocks in a blockchain network.

BACKGROUND OF INVENTION

In this document we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction (TX) is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

Network nodes that receive a new transaction will quickly try to push that transaction out to other nodes in the network. Before transmitting a new transaction to other nodes, it is "validated," meaning it is checked against a set of criteria to ensure the transaction meets the basic requirements for a proper transaction according to the applicable protocol.

In order for a transaction to be written to the blockchain, it is incorporated into a block by a node (a "miner") that is designed to collect transactions and form them into blocks. The miner then attempts to complete a "proof of work" with respect to the block. Miners throughout the blockchain network compete to be the first to assemble a block of transactions and complete the associated proof of work for that block. The successful miner adds its confirmed block to the blockchain and the block is propagated through the network so that other nodes that maintain a copy of the blockchain can update their records. Those nodes receiving a block also "validate" that block and all the transactions in it to ensure it complies with the formal requirements of the protocol. For example, a node that receives a new block may check to confirm that the block data structure obeys applicable syntax rules, that the block has a timestamp that complies with age requirements, that the block is within prescribed size limits, and other such criteria. It also confirms that every transaction in the block is valid. Example criteria applicable to the Bitcoin protocol are defined in the Bitcoin Core client functions CheckBlock and CheckBlockHeader.

The criteria for validating a transaction can be lengthy. For example, the conditions applicable in the Bitcoin protocol may be seen in detail in the functions AcceptToMemoryPool, CheckTransaction and CheckInputs in the bitcoin reference client.

One of the potential bottlenecks associated with blockchain implementation is the time it takes for a node to complete a block validation, including validating all of the transactions in the block. That delay may hamper and impede the use of blockchain for fast, large-volume processing. Moreover, when a miner in the Proof-of-Work (PoW) network receives notice that a block has been completed prior to finishing its own proof of work, that miner abandons its efforts and begins trying to build the next block. Therefore, slow validation means that miners continue their efforts unnecessarily. Mining is a processor and energy intensive activity, and so wasted mining effort is expensive in terms of resources.

Thus, there are technical problems associated with validation of blockchain transactions. These include problems relating to the speed, efficiency and resource requirements involved in the process of validating blocks. Validation and subsequent propagation of blocks requires energy, time and effort by nodes in the network and improvements to the process would be highly beneficial in not just in terms of network performance and speed, but also in relation to the amount of resources required. It would be desirable to provide for improved methods and devices that enable faster propagation of blocks in a bitcoin network. Such an improved solution has now been devised.

SUMMARY OF INVENTION

Thus, in accordance with the present invention there are provided methods and devices as defined in the appended claims.

The present application provides an improved device and method. The method may be a method for validating blocks. The blocks may be blocks of blockchain transactions. The invention may enable faster decisions on whether a block is valid or invalid. Faster validation may result in reductions in wasted resources as blocks are propagated through the system more quickly. Also, less time and fewer resources are wasted on validating and propagating competing blocks which eventually end up in conflict and lose out to an earlier block. The present invention may enable parallelization of some of the transaction-level validation operations. Confirmation of unique UXTOs across all transactions in a block may not be parallelized so as to avoid costly synchronization among parallel processors.

Additionally or alternatively, the present application may describe a computer-implemented method. It may be described as a validation method. It may comprise a method to validate a block within a network of nodes implementing a blockchain. The blockchain may conform to or operate in association with a blockchain protocol. The block may comprise a plurality of (blockchain) transactions. The method may include: determining that the block complies with block-level validation criteria and determining, serially, that each unspent transaction output (UTXO) referenced as an input in each of the plurality of transactions is unique and, based on that determination allocating each transaction in the plurality of transactions to one of two or more parallel processors, and verifying, in parallel, by the two or more parallel processors, that the transactions in the plurality of transactions comply with transaction-level validation criteria.

The method may further include, if the transactions comply with transaction-level validation criteria and the block complies with block-level validation criteria, forwarding the block to one or more peer nodes in the network.

In some implementations, the transaction-level validation criteria include transaction characteristics prescribed by the blockchain protocol, and each transaction must have the transaction characteristics to be deemed valid. Similarly, in some implementations the block-level validation criteria are block characteristics prescribed by the blockchain protocol, and each block must have the block characteristics to be deemed valid.

In some implementations, allocating each transaction in the plurality of transactions to one of two or more parallel processors includes allocating the transactions using a random allocation scheme or a deterministic allocation scheme. In one example, the scheme includes allocating the transactions among the two or more parallel processors using a first-come first-serve algorithm. In some example implementations, allocating includes determining a processing cost associated with each transaction and allocating the transactions to load balance the processing cost among the two or more parallel processors. The processing cost for each transaction may be based on a number of script operations in that transaction. The processing cost for each transaction may further be based on a weighted sum of script operations, wherein each script operation has an associated weight based on its computational complexity.

In some implementations, the method may include determining, serially, that each unspent transaction output referenced as an input in each of the plurality of transactions is unique by determining that each unspent transaction output only appears once as an input in the plurality of transactions.

Additionally or alternatively, the present application describes a computing device within a network of nodes implementing a blockchain, configured to validate a block conforming to a blockchain protocol, the block containing a plurality of transactions. The computing device may include a network interface to provide network connectivity to a network of nodes implementing a blockchain, and to receive a block, the block conforming to a blockchain protocol and containing a plurality of a transactions; a block-level validation module to determine that the block complies with block-level validation criteria; an input uniqueness confirmation module to determine, serially, that each unspent transaction output referenced as an input in each of the plurality of transactions is unique; two or more parallel processors to verify, in parallel, that the transactions in the plurality of transactions comply with transaction-level validation criteria; and a transaction allocation unit to allocate the transactions in the plurality of transactions among the two or more parallel processors for verification. If the transactions comply with transaction-level validation criteria and the block complies with block-level validation criteria, the network interface is to forward the block to one or more peer nodes in the network.

Additionally or alternatively, the present application may describe a non-transitory processor-readable medium storing processor-executable instructions that, when executed, cause one or more processors to carry out one or more of the processes and/or operations described herein.

BRIEF DESCRIPTION OF THE DRAWINGS

Any feature described in relation to one aspect or embodiment of the invention may also be used in respect of one or more other aspects/embodiments. These and other aspects of the present invention will be apparent from and elucidated with reference to, the embodiment described herein. An embodiment of the present invention will now be described, by way of example only, and with reference to the accompanying drawings, in which.

DETAILED DESCRIPTION

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
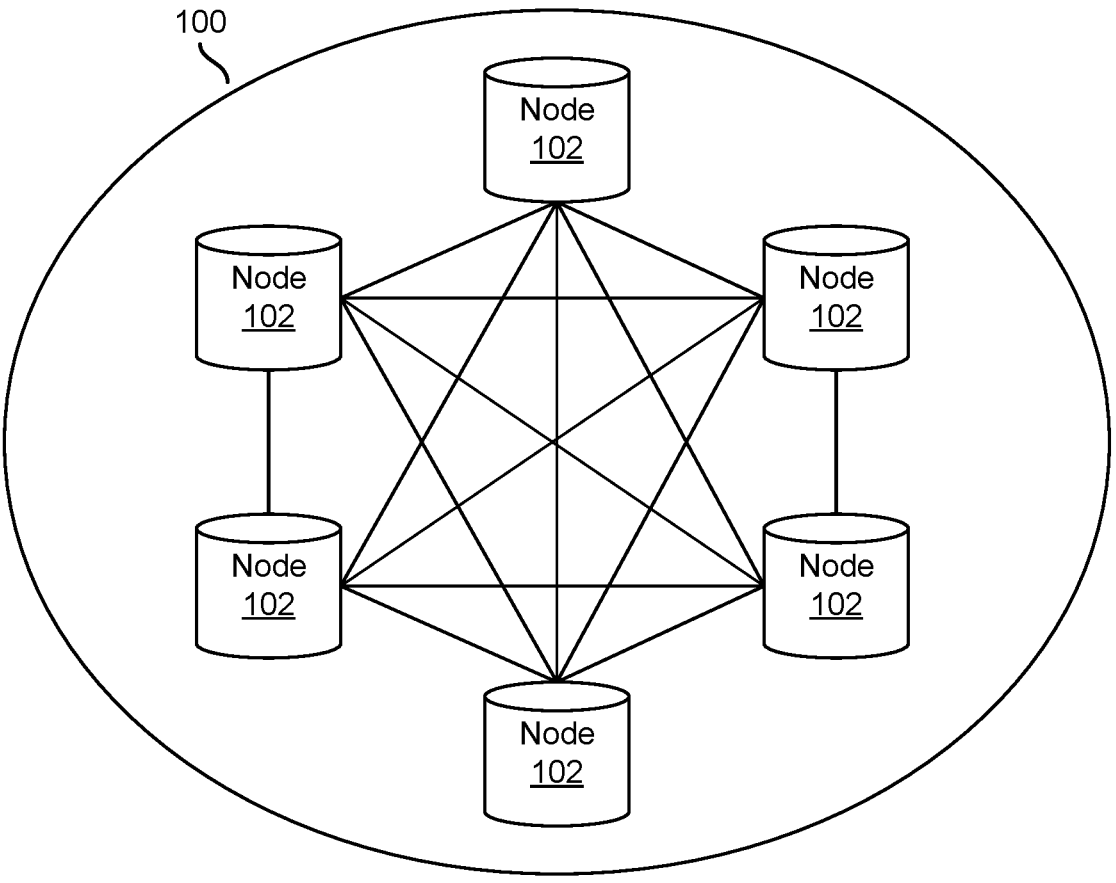
FIG. 1 illustrates an example blockchain network of nodes.

Reference will first be made to FIG. 1 which illustrates, in block diagram form, an example blockchain network 100 associated with a blockchain. The blockchain network is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example.

The electronic devices that run the blockchain protocol and that form the nodes 102 of the blockchain network 100 may be of various types including, for example, computers such as desktop computers, laptop computers, tablet computers, servers, mobile devices such a smartphones, wearable computers such as smart watches or other electronic devices.

Nodes 102 of the blockchain network 100 are coupled to one another using suitable communication technologies which may include wired and wireless communication technologies. In many cases, the blockchain network 100 is implemented at least partly over the Internet, and some of the individual nodes 102 may be located in geographically dispersed locations.

Nodes 102 maintain a global ledger of all transactions on the blockchain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which value is transferred as a result of the transaction. That value is then associated with that output address as an unspent transaction output. A subsequent transaction may then reference that address as an input in order to spend or disperse that value.

As noted above, mining nodes ("miners") compete in a race to create the next block in the blockchain. To assemble a block, a miner will build the block as a set of transactions from the pool of unconfirmed transactions (the "mempool"). It then attempts to complete a proof of work with respect to the block it has assembled. If it manages to complete the proof of work prior to receiving notice that any other miner has succeeded in generating a block and completing its proof of work, then the miner propagates its block by sending it to peer nodes on the network. Those nodes validate the block and then send it further on in the network to other nodes. If the miner receives notice that another block has been completed prior to finishing its own proof of work, then the miner abandons its efforts and begins trying to build the next block.

Thus, fast propagation of blocks helps to avoid wasted effort on behalf of miners and validating nodes. By providing a solution which enables faster validation and thus propagation of blocks, the present invention provides an enhanced network performance. It reduces the amount of computing time and effort required, and thus the amount of energy required by the network. It provides a network which is more efficient in terms of resources and time. It provides, ultimately, an improved (blockchain) network.

In current implementations of blockchain, such as the Bitcoin network, each node that receives a block first validates the block before sending it to other nodes. The time taken to validate a block slows propagation of the block through the network. Note that some implementations of blockchain, including evolutions of existing protocols, may provide for block validation by only a subset of nodes rather than each node in the network; however, block validation at most nodes is still likely to be a feature of any blockchain implementation to prevent invalid blocks from propagating through the network.

Validating a block involves confirming that the block meets prescribed criteria set by the applicable blockchain protocol. Example criteria applicable to the Bitcoin protocol are defined in the Bitcoin Core client functions CheckBlock and CheckBlockHeader. In addition to confirming that the block itself conforms to prescribed criteria, each transaction within the block may be assessed for compliance with transaction-level criteria. As an example, the transaction-level criteria applied in the Bitcoin protocol may be seen in detail in the functions AcceptToMemoryPool, CheckTransaction and CheckInputs.

Specific examples of block-level criteria, based on the Bitcoin protocol, include:

The block data structure is syntactically valid.

The block header hash is less than the target difficulty (enforcing the proof of work).

The block timestamp is less than two hours in the future (allowing for time errors).

The block size is within acceptable limits.

The first transaction (and only the first) is a coinbase generation transaction.

All transactions within the block are valid.

Specific examples of transaction-level criteria, based on the Bitcoin protocol, include:

The transaction's syntax and data structure must be correct.

Neither the list of inputs nor of outputs are empty.

Each output value x, as well as the total of all outputs, must be within the range $0 < x < 21 \cdot 10^6$ None of the inputs have null hash.

nLockTime is less than or equal to INT MAX.

The transaction size in bytes is greater than or equal to a minimum and less than a maximum.

The number of signature operations is less than the signature operation limit.

The unlocking script scriptSig can only push numbers on the stack, and the locking script scriptPubkey must match isStandard forms.

For each input, if the referenced output exists in any other transaction in the pool, the transaction must be rejected.

For each input, if the referenced output transaction is a coinbase output, it must have at least COIN-BASE_MATURITY (100) confirmations.

For each input, the referenced output must exist and cannot already be spent.

Using the referenced output transactions to get input values, check that each input value, as well as the sum, are in the allowed range of values x, i.e. $0 < x < 21 \cdot 10^6$.

A matching transaction in the pool, or in a block in the main branch, must exist.

The sum of input values must be equal to or more than the sum of output values.

The transaction fee must be sufficient to gain entry to an empty block.

The unlocking scripts for each input must validate against the corresponding output locking scripts.

These example criteria are illustrative and should not be interpreted as sufficient or necessary to all embodiments as the prescribed criteria may differ in different protocols and may change over time for a given protocol if changes are made to the protocol. In general, transaction-level validation criteria are those prescribed characteristics which a transaction must have to be considered valid under the applicable blockchain protocol. Similarly, the block-level validation criteria are those prescribed characteristics which a block must have to be considered valid under the applicable blockchain protocol.

In accordance with the present application methods and devices are described that speed up block validation so as to facilitate faster propagation of blocks in the network.

In one aspect, the present application describes a node structured to validate blocks by performing transaction-level validation of individual transactions in parallel. However, certain transaction-level criteria are not to be evaluated in parallel. In particular, the uniqueness of UTXOs is to be evaluated on a serial basis. Accordingly, the node is structured or arranged to confirm the uniqueness of the referenced inputs (UTXOs) of the transactions prior to allocating the transactions among a set of two or more parallel processors for validation of the remaining transaction-level criteria.

The term "processors" when used in connection with the description of parallel processors herein does not necessarily mean physically distinct microprocessors and may include any hardware or software implementation that enables parallel processing resources capable of carrying out processor functions independently and in parallel. The parallel processors may include one processor having multiple cores. In some instances, the parallel processors may include multiple separate processing units. The parallel processors may or may not share a physical memory. Each parallel processor, howsoever implemented, has a software or hardware mechanism for signalling, such as to output a signal in response to identifying an invalid transaction. The implementation of the parallel processors also includes providing for the requisite data transfer mechanism, in software and/or hardware, to route the allocated transaction data to the respective processors for local processing.

Figure 2:
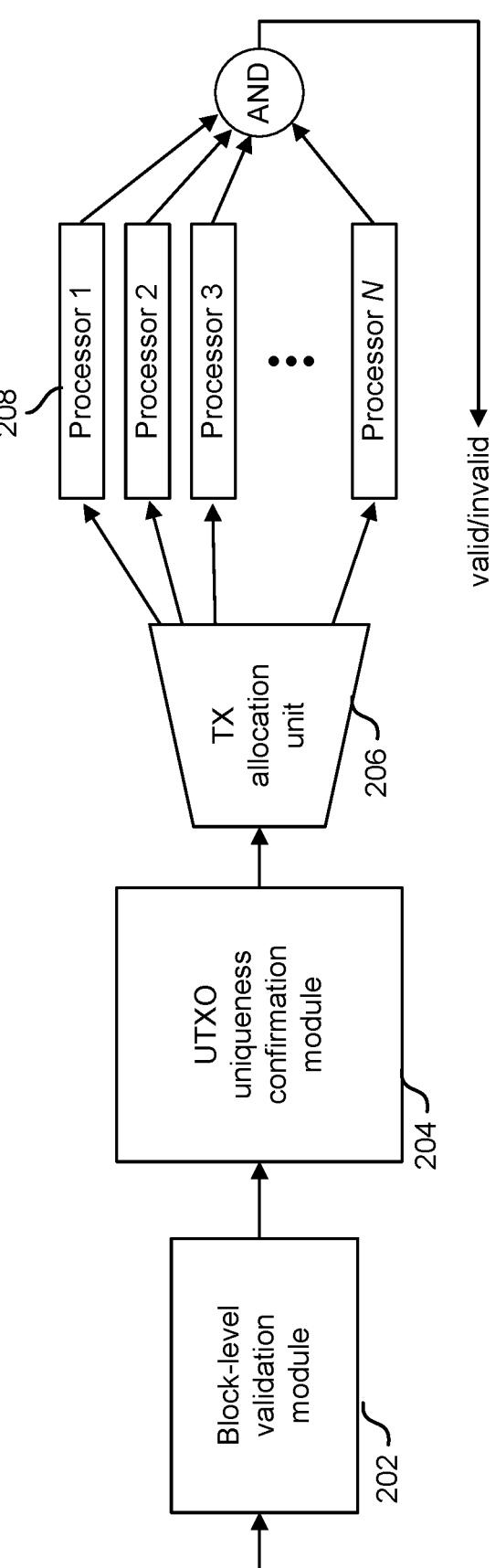
FIG. 2 diagrammatically shows an example block validation process in a node.

Reference is now made to FIG. 2, which diagrammatically shows a simplified example of a block-validation process 200 in a node of a blockchain network. The process 200 includes a block-level validation stage 202, at which an incoming new block is tested against block-level criteria. Example block-level criteria are described above and generally relate to prescribed formatting requirements and characteristics or limits applicable to the block itself, as opposed to the transactions within the block. Examples include the block size, the block header structure or content, and similar criteria.

The process 200 further includes a UTXO uniqueness confirmation module 204, which evaluates whether each of the inputs, i.e. each UTXO, to a transaction in the new block is unique. If the same UTXO appears more than once as an input in the new block, it indicates a potential double-spending problem and violates the UTXO uniqueness criteria. If the UTXO uniqueness confirmation module 204 identifies a UTXO that is referenced more than once among the transaction inputs in the new block, then it outputs an error signal or other interrupt to indicate that the block is to be rejected.

Assuming that the new block does not get rejected, i.e. that all the UTXO inputs are unique, then the individual transactions are allocated among a set of parallel processors 208 by a transaction allocation unit 206. The transaction allocation unit 206 may employ any one of a number of possible allocation schemes for dividing the transactions in the block amongst the individual processors 208. In some instances, the allocation scheme may be aimed at load balancing. The allocation may be characterized as "job shop scheduling" where a set of jobs having varying processing times is allocated among a set of machines/processors 208 each having its own processing capacity or power, while trying to minimize the length of the longest processing time among the processors 208. Further example details are provided below.

The individual processors 208 validate the transactions that have been allocated to them against transaction-level validation criteria. The processors 208 do not require synchronization paradigms between them; they each work independently on verifying that the transactions that they have been allocated are valid. Each processor 208 outputs a result confirming the validity of its allocated transactions, and the results are added to confirm that all the transactions in the block are valid. In the event that one of the processors 208 identifies a non-compliant transaction, i.e. an invalid transaction, then it may issue an output, such as an interrupt or other signal, to indicate that there is an invalid transaction. That interrupt or signal may be sent to the other processors 208 so that they can immediately cease testing their respective transactions and not waste further resources on validating transactions within a block that is to be rejected.

Note that the block-level criteria are shown in the example process 200 as being tested first; however, it will be appreciated that the block-level validation stage 202 may occur after the transaction-level validation testing or, in some instances, in parallel with the transaction-level validation testing.

Figure 3:
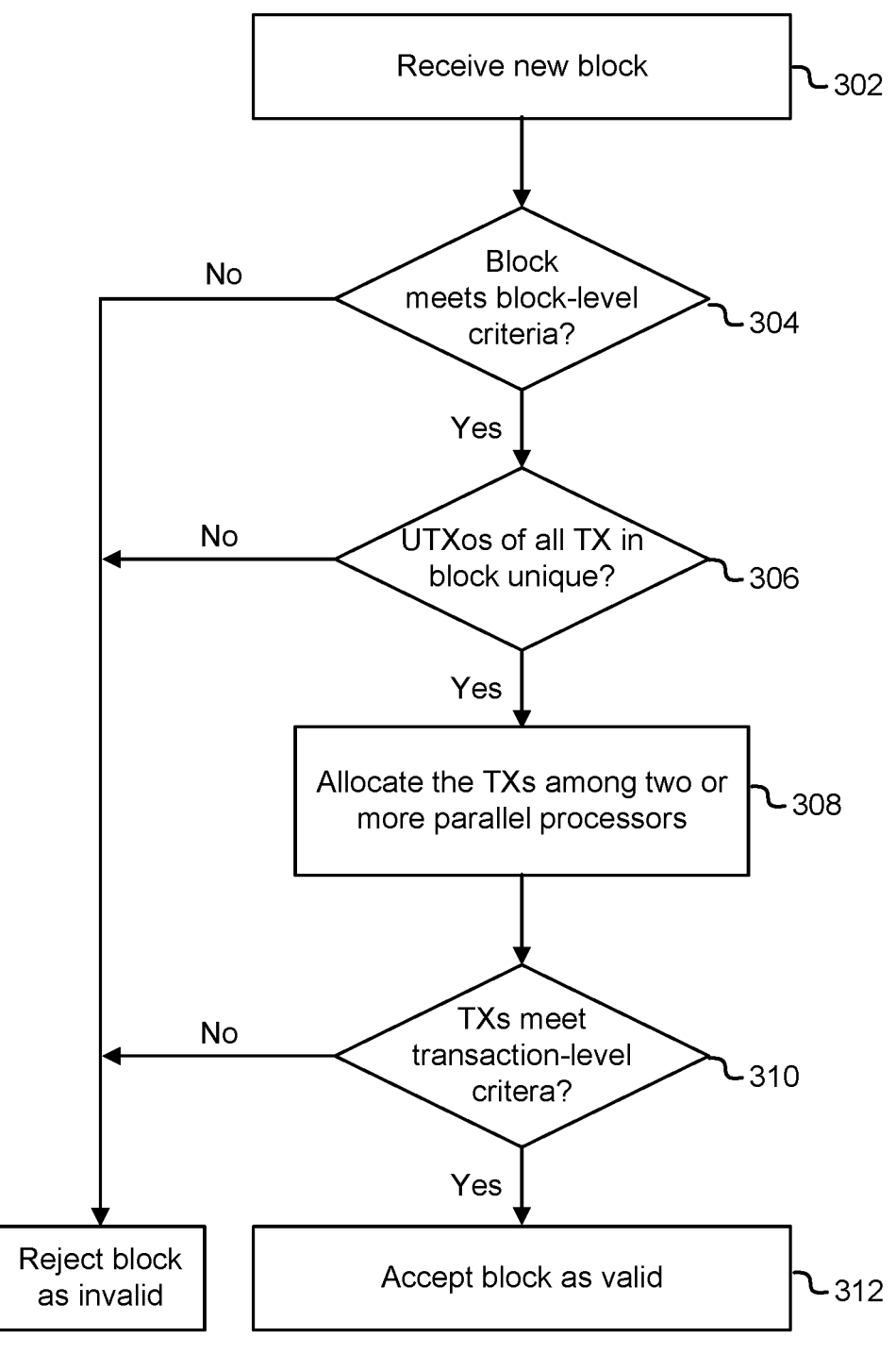
FIG. 3 shows, in flowchart form, one example of a block validation method.

Reference will now be made to FIG. 3, which shows, in flowchart form, one example method 300 of validating a block in a blockchain network. The block contains a plurality of transactions, each transaction references one or more inputs, and each input is a UXTO (except in the case of a coinbase generation transaction). The method 300 is implemented using suitable hardware and processor-executable instructions within a node on the blockchain network.

In operation 302 the node receives a new block. The new block may be received from a mining node that generated the new block and completed the proof-of-work. The new block may be received from another (non-mining) node in the network. Before forwarding the new block to any other nodes in the network, the current node validates the block. As discussed above, the validation of the new block includes confirming that the block meets certain block-level criteria and confirming that each of the transactions in the block is valid.

In operation 304, the node assesses whether the new block meets the block-level criteria. As noted previously, this operation 304 may be performed later in the method 300 in some implementations, and, in some cases, may be performed in parallel with other operations. The block-level criteria may include confirming that the block structure meets syntax requirements, that the timestamp meets currency requirements, and that the block size is within prescribed limits, among others.

If the new block meets these block-level criteria, then in operation 306 the node assesses whether the inputs to the individual transactions are unique. That is, the node determines whether any of the UXTOs referenced as inputs appears more than once in the block. If so, then the UXTOs are not unique and the block is to be rejected. The determination that the UXTOs are unique cannot be performed in parallel without using computationally expensive synchronization paradigms between parallel processing units. Accordingly, operation 306 is carried out serially.

In one example implementation, a hash table of referenced outputs (UXTOs) in transaction inputs may be used, where each UXTO has a Boolean value initialized to false. A double-spend attack occurs if a given hash table entry with value already set to true is referenced again. In such a case, the UXTOs are not unique, and the entire block can be considered invalid and the process 300 is aborted.

In another example implementation, binary search trees may be used, for example through the map data structure in C++. Maps are associative containers that store elements formed by a combination of a key value and a mapped value, following a specific order. Given n transactions, search, insert and delete time complexity are $O(\log n)$ on average and $O(n)$ in the worst case.

If the UXTOs in the new block are unique, then in operation 308 the node allocates the transaction among the parallel processors.

An additional hash table may be used during the serial processing of operation 306 to keep track of the transactions that depend on other transactions within the block. In one implementation, an identifier $id_{dep}$ (starting from zero) is assigned to the currently analysed transaction. If a transaction is dependent upon another transaction, then it will be assigned the same identifier as the transaction from which it depends. That is, two or more dependent transactions will have the same identifier, and each new transaction that is not dependent on any transaction yet seen will have an increasing $id_{dep}$ value. Each set of dependent transactions will be pre-assigned to the same processing unit, e.g. $id_{CPU}=id_{dep}$ modulo N, where N is the number of parallel processing units. A dependent transaction is one that, for example, has an input that is an output from the transaction from which it depends.

In the simplest implementation, the allocation of transactions among processors is based on the number of processors and the number of transactions, without regard to differences in processor demand and/or capacity. However, to better balance the processing load among the available processors, in some implementations the node may take into account the complexity of the transaction and, in particular, the complexity of validating each transaction. One such measure of (or proxy for) processing load is the number of scripting operations involved in the transaction. That is, the time required to validate an individual transaction j may be considered to be proportional to the number $c_j$ of scripting operations involved. For instance, in case of P2PKH transactions, $c_j$ is the sum of the number of operations in the signature script (input) and the number of operations in the public key script (referenced output).

In another example, a different weight w can be assigned to different script operations. For instance, OP_HASH160 and OP_CHECKSIG are orders of magnitude more complex than a simple OP_EQUAL operation. Therefore, the overall cost $c_j$ for the validation of transaction j is defined as sum of its M individual weighted script operations $w_j$.

$$c_j = \sum_{i=0}^{M-1} w_j(i)$$

The weights $w_j$ may be hard-coded based on the complexity of scripting operations prescribed or defined by the applicable blockchain protocol.

To prevent some forms of attack on the computational resources of the node, a threshold T can be set. If $c_j > T$ for any transaction j, the node can determine that is will not validate the block. The value of T may be made directly proportional to the computational power of an individual processing unit in the local validation node, measured in hertz or instructions per second.

The scheduling scheme S distributes the list of transaction validations $\{c_j\}$, $0 \leq j < n$ among the CPUs. This problem is known as job shop scheduling: n jobs $\{J_1, J_2, \ldots, J_n\}$ of varying processing times need to be scheduled on N machines with varying processing power, while trying to minimize the total length of the schedule U (makespan), i.e. the time it takes for the parallel processing to be completed. In some implementations, the allocation of transactions among processors may be in accordance with a random allocation scheme. In some implementations, the allocation may be in accordance with a deterministic allocation scheme.

Two example scheduling schemes include the following:

FCFS (First Come First Served) sequentially assigns the transactions to the available processing units in a round-robin fashion. This is a species of a random allocation scheme. Given the t-th transaction from the top of the block, the core with ID t modulo N will be responsible for the validation. This scheduler is the least computationally complex.

The LPT (Longest Processing Time) greedy algorithm provides a more effective load-balancing solution and is an example of a deterministic allocation scheme. The jobs (transactions) may be first sorted by their respective processing time (number of scripting operations, or a "cost" based on sum of weighted scripting operations) and then assigned to the machine with the earliest end time so far, so as to balance the computational load for each processor.

In some implementations, a FCFS scheme could be subject to a malicious attack exploiting the degree of parallelism N of a validation node, e.g. building a block with demanding scripts every N or N/2 transactions. To avoid this scenario, a truly random transaction verification allocation can be used with no extra cost.

The LPT algorithm achieves the following upper bound U respect to the theoretical optimum $U_0$:

$$\frac{U}{U_0} = \frac{4}{3} - \frac{1}{3N}$$

Note that sorting algorithms, like Mergesort, are characterized by O(n log n) worst and average time complexity. However, the UTXO uniqueness assessment of operation 306 may be performed while sorting the $c_j$ values, thereby avoiding any extra computational cost.

Having allocated the transactions among the parallel processors, the method 300 then includes each of those processors independently validating the respective set of transactions it has been allocated, as indicated by operation 310. Once all the individual transactions have been verified as valid, then the node is able to accept the block as valid, as indicted by operation 312. Accepting or designating the block as valid may lead to additional functions based on the validity of the block, such as forwarding the valid block to one or more other peer nodes on the blockchain network. In some cases, it may include adding the block to the copy of the blockchain stored locally at the current node.

If any of the processors detect an invalid transaction, then the processor interrupts the validation method 300 and, as indicated by operation 314, the node rejects the block as invalid.

Thus, the invention provides one or more technical solutions to at least one technical problem in the prior art. For example, known blockchain arrangements do not teach the technique of serially verifying the validity of unspent transaction outputs (UTXOs) in all transactions prior to allocation of transactions among parallel processors. The Bitcoin Forum post on 8 Oct. 2014, for example, appears to suggest building a new data structure (output set) and attempting to guard against double spends from within the parallelized transaction verification process by checking against the output set structure (https://bitcointalk.org/index.php-?topic=816199.0 [Jun. 10, 2017] "Looking Into forking the core wallet to use parallel computing to verify blocks").

Figure 4:
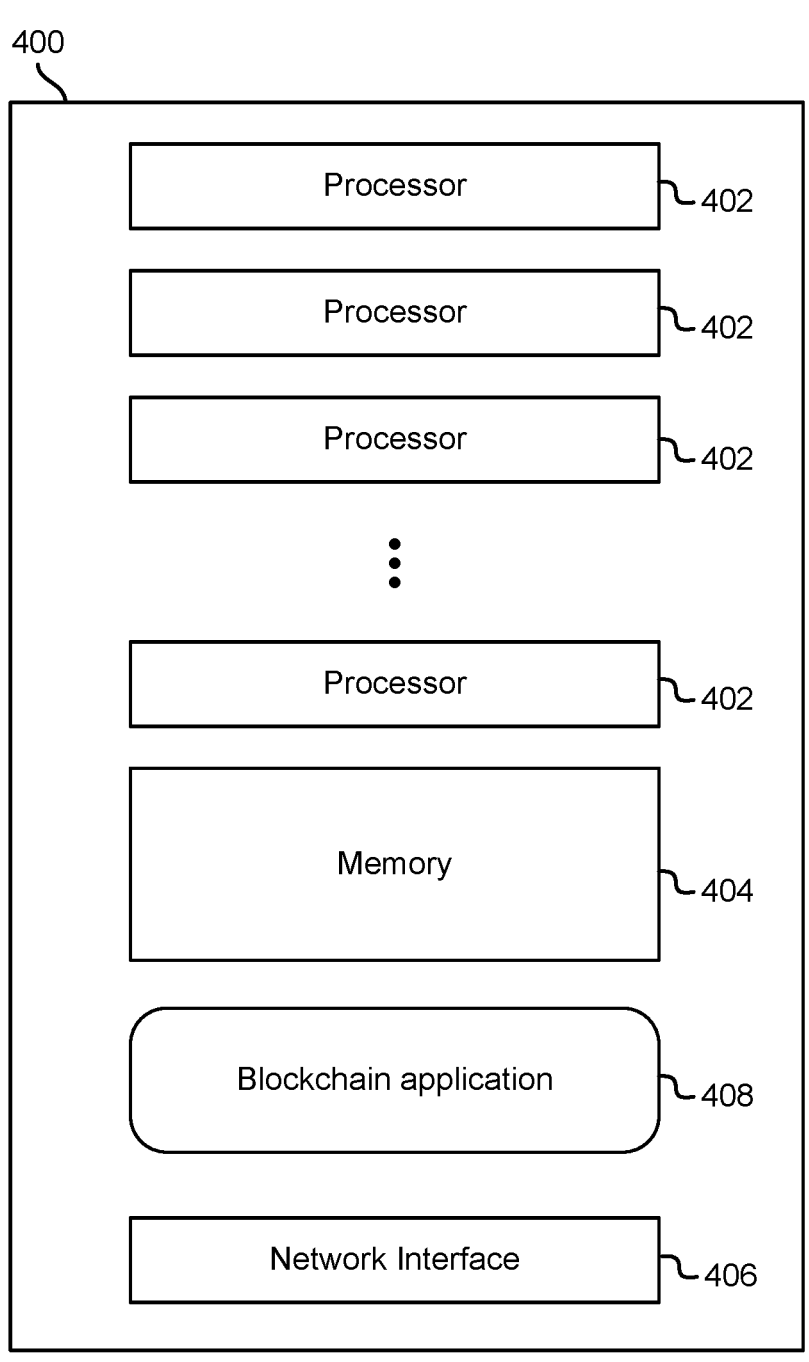
FIG. 4 shows a block diagram of a node for validating blocks in a blockchain network.

Reference will now be made to FIG. 4, which shows, in block diagram form, a simplified example of a node 400.

The node 400 includes a plurality of processors 402, which may include two or more microprocessors, application specific integrated chips (ASICs), microcontrollers, or similar computer processing devices. The processors 402 may include a multi-core processor.

The node 400 further includes memory 404, which may include persistent and non-persistent memory, to store values, variables, and in some instances processor-executable program instructions, and a network interface 406 to provide network connectivity over wired or wireless networks.

The node 400 includes a processor-executable blockchain application 408 containing processor-executable instructions that, when executed, cause the processors 402 to carry out one or more of the functions or operations described herein.

It will be understood that the devices and processes described herein and any module, routine, process, thread, application, or other software component implementing the described method/process for configuring the blockchain node may be realized using standard computer programming techniques and languages. The present application is not limited to particular processors, computer languages, computer programming conventions, data structures, other such implementation details.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises," and the like, does not exclude the presence of elements or steps other than those listed in any claim or the specification as a whole. In the present specification, "comprises" means "includes or consists of" and "comprising" means "including or consisting of." The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method to validate a block within a network of nodes implementing a blockchain conforming to a blockchain protocol, the block containing a plurality of transactions, the method comprising:

determining that the block is compliant with block-level validation criteria;

determining, serially, that each unspent transaction output referenced as an input in each of the plurality of transactions is unique;

in response to the determination that each unspent transaction output is unique, allocating transactions in the plurality of transactions among two or more parallel processors, wherein the allocating of the transactions in the plurality of transactions among the two or more parallel processors comprises:

for each transaction, determining a processing cost for verifying that the transaction complies with transaction-level validation criteria;

ordering the transactions in the plurality of transactions by the respective processing cost associated with each transaction;

in response to determining that the respective processing cost associated with each transaction is not greater than a predefined threshold, assigning each transaction, in order, to a parallel processor of the two or more parallel processors having an earliest end time, wherein the predefined threshold is proportional to computational power of one of the two or more parallel processors; and verifying, in parallel, by the two or more parallel processors, that the transactions in the plurality of transactions comply with the transaction-level validation criteria.

2. The method claimed in claim 1, wherein the transaction-level validation criteria comprise transaction characteristics prescribed by the blockchain protocol, and wherein each transaction must have the transaction characteristics to be deemed valid.

3. The method claimed in claim 2, wherein the block-level validation criteria comprise block characteristics prescribed by the blockchain protocol, and wherein each block must have the block characteristics to be deemed valid.

4. The method claimed in claim 1, wherein the processing cost for each transaction is based on a number of script operations in that transaction, wherein each script operation has an associated weight based on its computational complexity of the respective script operation and, optionally, wherein the processing cost for each transaction is further based on a weighted sum of script operations.

5. The method claimed in claim 1, wherein determining, serially, that each unspent transaction output referenced as an input in each of the plurality of transactions is unique comprises determining that each unspent transaction output only appears once as an input in the plurality of transactions.

6. The method claimed in claim 1, further comprising, assigning an identifier to each transaction of the plurality of transactions, wherein a transaction dependent upon another transaction of said plurality of transactions is assigned the same identifier as the transaction from which it depends, wherein transactions having the same identifier are allocated to the same one of said two or more parallel processors.

7. The method claimed in claim 6, wherein the step of assigning an identifier to each transaction of the plurality of transactions is performed at the same time as the step of determining, serially, that each unspent transaction output referenced as an input in each of the plurality of transactions is unique.

8. The method claimed in claim 1, further comprising, in response to determining that the transactions in the plurality of transactions comply with the transaction-level validation criteria and the block is compliant with the block-level validation criteria, forwarding the block to one or more peer nodes in the network of nodes.

9. A non-transitory processor-readable medium storing processor-executable instructions within a network of nodes implementing a blockchain, where the instructions are to validate a block conforming to a blockchain protocol, the block containing a plurality of transactions, and wherein the instructions cause two or more processors to carry out the method claimed in claim 1.

10. A computing device within a network of nodes implementing a blockchain, configured to validate a block conforming to a blockchain protocol, the block containing a plurality of transactions, the computing device comprising:

a network interface to provide network connectivity to the network of nodes implementing the blockchain, and to receive the block, the block conforming to the block-chain protocol and containing the plurality of transactions;

a plurality of processors; and a memory storing instructions that, when executed by one or more processors of the plurality of processors, cause the computing device to:

determine, via the one or more processors, that the block complies with block-level validation criteria;

determine, serially, via the one or more processors, that each unspent transaction output referenced as an input in each of the plurality of transactions is unique;

allocate, via the one or more processors, transactions in the plurality of transactions among two or more parallel processors of the plurality of processors for verification, the transactions in the plurality of transactions being allocated by:

for each transaction, determining a processing cost for verifying that the transaction complies with transaction-level validation criteria;

ordering the transactions in the plurality of transactions by the respective processing cost associated with each transaction;

in response to determining that the respective processing cost associated with each transaction is not greater than a predefined threshold, assigning each transaction, in order, to a parallel processor having an earliest end time, wherein the predefined threshold is proportional to computational power of one of the two or more parallel processors; and verify, in parallel, via the two or more parallel processors, that the transactions in the plurality of transactions comply with the transaction-level validation criteria.

11. The computing device claimed in claim 10, wherein the transaction-level validation criteria comprise transaction characteristics prescribed by the blockchain protocol, and wherein each transaction must have the transaction characteristics to be deemed valid.

12. The computing device claimed in claim 11, wherein the block-level validation criteria comprise block characteristics prescribed by the blockchain protocol, and wherein each block must have the block characteristics to be deemed valid.

13. The computing device claimed in claim 10, wherein the processing cost for each transaction is based on a number of script operations in that transaction, wherein each script operation has an associated weight based on its computational complexity and, optionally, wherein the processing cost for each transaction is further based on a weighted sum of script operations.

14. The computing device claimed in claim 10, wherein the computing device is further caused to determine, serially, via the one or more processors, that each unspent transaction output referenced as an input in each of the plurality of transactions is unique by determining that each unspent transaction output only appears once as an input in the plurality of transactions.

15. The computing device claimed in claim 10, wherein, in response to determining that the transactions in the plurality of transactions are compliant with the transaction-level validation criteria and the block is compliant with the block-level validation criteria, the network interface is to forward the block to one or more peer nodes in the network of nodes.

\* \* \* \* \*